US008532070B2

(12) United States Patent
Pandian et al.

(10) Patent No.: US 8,532,070 B2
(45) Date of Patent: Sep. 10, 2013

(54) FAST HANDOFF FOR WIRELESS DEVICES IN A WIRED-WIRELESS NETWORK

(75) Inventors: Gnanaprakasam Pandian, Cupertino, CA (US); Navindra Yadav, San Jose, CA (US); Sheausong Yang, Saratoga, CA (US); Bhanu Gopalasetty, San Jose, CA (US); Senthil Arunachalam, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1303 days.

(21) Appl. No.: 11/640,579

(22) Filed: Dec. 18, 2006

(65) Prior Publication Data
US 2008/0146230 A1    Jun. 19, 2008

(51) Int. Cl.
H04W 4/00    (2009.01)
(52) U.S. Cl.
USPC ........... 370/338; 455/436; 455/437; 455/438; 455/439; 455/440; 455/441; 455/442; 455/444; 455/448; 455/446; 370/331; 370/329
(58) Field of Classification Search
USPC .......................... 455/436–448; 370/329–332
See application file for complete search history.

(56) References Cited

U.S. PATENT DOCUMENTS

| | | | | |
|---|---|---|---|---|
| 5,875,185 A * | 2/1999 | Wang et al. | | 370/331 |
| 7,016,682 B2 * | 3/2006 | Won et al. | | 455/445 |
| 7,545,754 B2 * | 6/2009 | Funato et al. | | 370/254 |
| 2002/0045424 A1* | 4/2002 | Lee | | 455/41 |
| 2002/0091860 A1* | 7/2002 | Kalliokulju et al. | | 709/247 |
| 2003/0193952 A1* | 10/2003 | O'Neill | | 370/392 |
| 2004/0005893 A1* | 1/2004 | Isobe et al. | | 455/436 |
| 2004/0064581 A1* | 4/2004 | Shitama et al. | | 709/238 |
| 2005/0083933 A1 | 4/2005 | Fine et al. | | |
| 2005/0163078 A1 | 7/2005 | Oba et al. | | |
| 2006/0072542 A1 | 4/2006 | Sinnreich et al. | | |
| 2006/0083192 A1* | 4/2006 | Dinescu et al. | | 370/328 |
| 2006/0098607 A1 | 5/2006 | Zeng et al. | | |
| 2006/0123079 A1 | 6/2006 | Sturniolo et al. | | |
| 2006/0215623 A1* | 9/2006 | Lin et al. | | 370/338 |
| 2006/0221993 A1* | 10/2006 | Liao et al. | | 370/449 |
| 2007/0060127 A1* | 3/2007 | Forsberg | | 455/436 |
| 2007/0064647 A1* | 3/2007 | Prasad | | 370/331 |
| 2009/0059865 A1* | 3/2009 | Zhang et al. | | 370/331 |

FOREIGN PATENT DOCUMENTS

WO    WO 2005/027560 A1 *    3/2005

OTHER PUBLICATIONS

RFC 3547 "The Group Domain of Interpretation", IETF, M. Baugher et al., Jul. 2003.
RFC 3740 "The Multicast Group Security Architecture", IETF, T. Hardjono et al., Mar. 2004.
RFC 2627 "Key Management for Multicast: Issues and Architecture", IETF, D. Wallner et al., Jun. 1999.
RFC 4046 "Multicast Security (MSEC) Group Key Management Architecture", IETF, M. Baugher et al., Apr. 2005.

* cited by examiner

*Primary Examiner* — Kamran Afshar
*Assistant Examiner* — Sayed T Zewari
(74) *Attorney, Agent, or Firm* — Cindy Kaplan

(57) ABSTRACT

A method and apparatus for handoff of a wireless client from a first network device to a second network device in a wired network are disclosed. In one embodiment, the method includes receiving data from a new wireless client at the second network device and transmitting a request for a route update for the new wireless client to the wired network. Prior to network convergence for the route update, data traffic for the new wireless client is received from the first network device and forwarded to the new wireless client. Context information for the new wireless client is transmitted from the second network device to other network devices in a proximity group of the second network device.

18 Claims, 12 Drawing Sheets

FAST HANDOFF FOR WIRELESS DEVICES IN A WIRED-WIRELESS NETWORK

BACKGROUND OF THE INVENTION

The present disclosure relates generally to traffic distribution for wireless clients in a wired network.

When wireless local area networks (WLANs) are deployed, a contiguous radio frequency (RF) region is created due to RF coverage overlapping from different access points (APs). A contiguous RF region may range from as small as a single AP to as large as thousands or even tens of thousands of APs. When a client moves from one AP to another AP it is referred to as client roaming. Roaming within an IEEE 802.11 based WLAN is typically seamless (e.g., client retains existing services and its identity). The demand for fast and seamless roaming with minimal disruption is becoming increasingly important as VoIP phones and dual-mode mobile phones (Cellular+WLAN VoIP) are gaining popularity.

The time period for roaming from one AP to another AP comprises three phases. In the first phase the client searches for a new AP. While the client is scanning different frequency bands searching for surrounding APs to roam to, it tries to maintain a data path connection with the exiting AP so that there is no data path disruption. In the next phase, the client re-associates and re-authenticates to the new AP and its associated switch in a wired network. In this phase the client's policies and context are also transferred to the new switch, depending on the policies configured and the client context the transfer of the context may be a relatively time consuming task which may involve programming the new switch's hardware. The network path then converges to the new AP and switch in the third phase. This third phase is straight forward if roaming is between two APs connected to the same switch (intra-switch roaming). However, when roaming occurs between two APs connected to two different switches, the time required for a network to converge may result in a loss of traffic and degradation in voice call quality. This is due in part to route updates which propagate hop by hop and have to be processed on a switch CPU (central processing unit). Processing times can vary depending on the load on the CPU and other factors. If there is even a small loss of voice traffic during roaming (e.g., over 125 ms), users may perceive a significant drop in voice QoE (Quality of Experience).

BRIEF DESCRIPTION OF THE DRAWINGS

Corresponding reference characters indicate corresponding parts throughout the several views of the drawings.

DESCRIPTION OF EXAMPLE EMBODIMENTS

Overview

A method and apparatus for handoff of a wireless client from a first network device to a second network device in a wired network are disclosed. In one embodiment, the method generally comprises receiving data from a new wireless client at the second network device and transmitting a request for a route update for the new wireless client to the wired network. Prior to network convergence for the route update, data traffic for the new wireless client is received from the first network device and forwarded to the new wireless client. Context information for the new wireless client is transmitted from the second network device to other network devices in a proximity group of the second network device.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
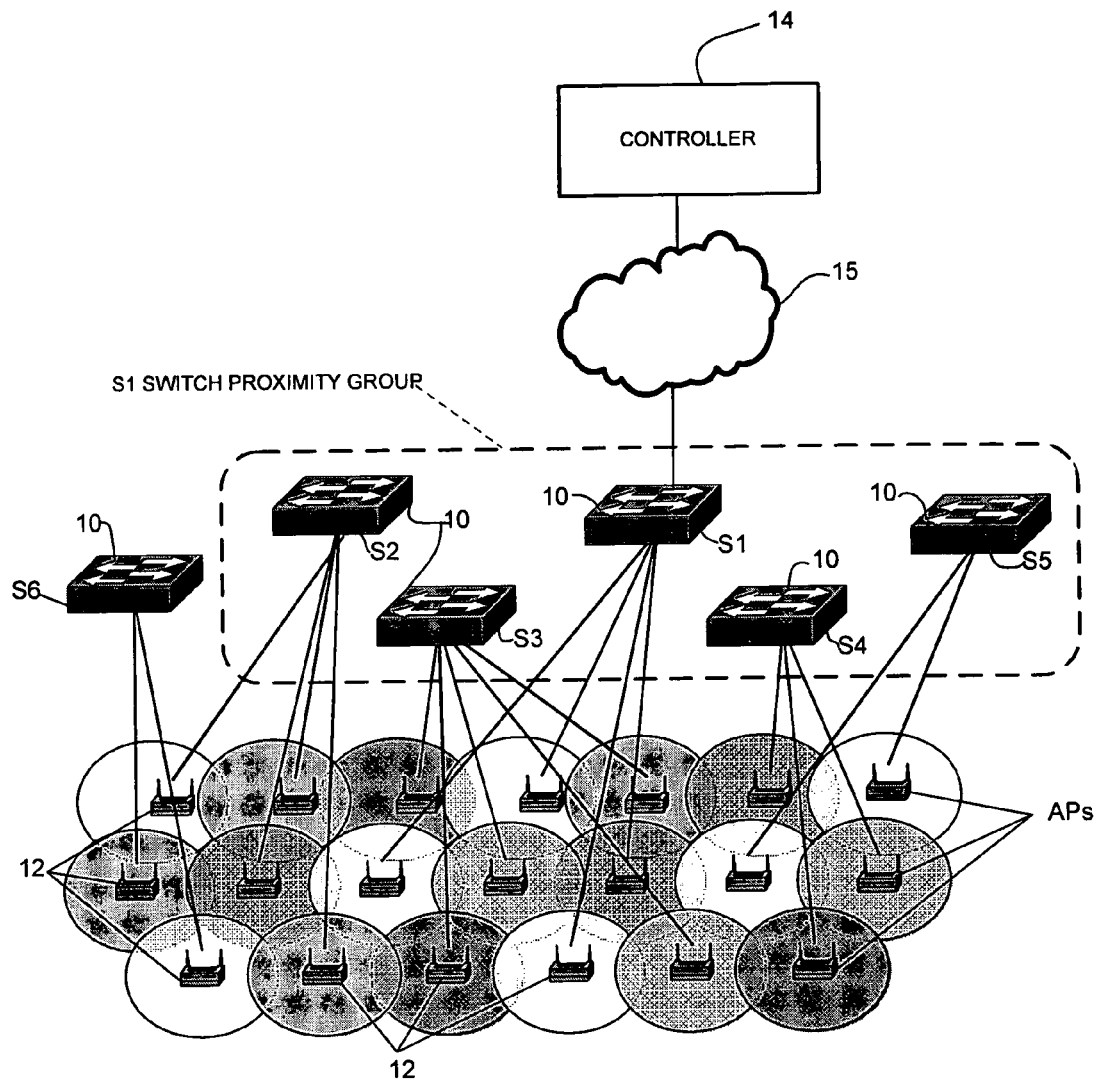
FIG. 1 illustrates an example of a network in which embodiments described herein may be implemented.

Referring now to the drawings, and first to FIG. 1, one example of a network that may implement embodiments described herein is shown. The embodiments operate in the context of a data communication network including multiple network elements. For simplification, only a small number of nodes are shown. Some of the nodes in a network that employs the embodiments may be network devices such as routers or switches. The network device may include, for example, a master central processing unit (CPU), interfaces, may be Application Specific Integrated Circuits (ASICs)/Network Processors (NP)/Field Programmable Gate Arrays (FPGAs), and a bus. The CPU preferably includes memory and a processor. The network device may be implemented on a general purpose network host machine such as a computer system or network device described below with respect to FIG. 12.

The network shown in FIG. 1 comprises a controller 14 and a plurality of network devices (edge switches 10 (S1, S2, S3, S4, S5, S6)) in a wired network. The controller communicates with the switches 10 via a network 15. The switches 10 communicate with a plurality of Access Points (APs) 12. A contiguous RF (radio frequency) region (denoted by circles surrounding each AP on FIG. 1) is created due to RF coverage overlapping from APs 12. Any number of wireless clients (not shown) may be associated with an AP 12.

When a wireless client is associated with an AP, the client constantly scans the RF environment around it to find all APs surrounding it, and determines whether there are other APs which can provide better services than the currently associated AP based on multiple criteria such as of stronger RF signal (RSSI (received signal strength indicator)) and lower interference (SNR (signal to noise ratio)), etc. If the service level is significantly better, the wireless client triggers roaming logic and reassociates with a new AP. The wireless client performs this operation autonomously. Infrastructure can provide assistance to the mobile client to help in narrowing down the selection list, but the final decision to roam or not to roam is within control of the wireless client. From the wireless infrastructure point of view, the timing (when) and the destination (where) of the roaming are unpredictable. Conventional fast roaming techniques rely on a reactive approach and make the necessary infrastructure change after the client has initiated roaming. Infrastructure changes that are done after the roam has been initiated create a significant service disruption, which degrades the quality of wireless service for the roaming client.

Embodiments described herein utilize proximity groups to address the "where" aspect of roaming unpredictability and provide a method and system that is proactive and operable to minimize service disruption during roaming to improve the service of quality for a roaming client. Another advantage of the use of proximity groups is that it makes the solution scalable, resilient across a network as compared to traditional centralized wireless architectures, which build an overlay model and have all the wireless data traffic passing through a few central wireless aware devices to reduce the frequency of roaming events. Such traditional architectures suffer from tremendous scalability, availability, network integration issues. Since it is not possible to predict exactly which AP and which switch the client will roam to and when that roam will happen, the proximity group is used to narrow down the scope of target switches so that preparation of client context can be done ahead of actual roaming and data forwarding can be done during the roaming to minimize data loss. Use of proximity groups significantly reduce roam time by pushing the client context to a new switch prior to the client roam so that the new switch is ready to send and receive traffic upon roaming. While the network is still converging, the old switch forwards the client destined traffic to the new switch if the old switch knows which is the new switch to which the client has roamed to. Otherwise, the old switch simply forwards the traffic destined to the roamed client to all the other switches in its proximity group. This forwarding of the traffic stops as soon as the network converges.

The proximity group of a switch may include one or more neighboring switches where a wireless client can roam seamlessly from any AP connected to the switch to any AP of a neighboring switch. In one embodiment, switches are proximate to each other if the radios of their APs are adjacent to each other (e.g., RF adjacency). Switches, which are located close to each other or even connected to each other in the wired domain, may not be proximate to each other in the wireless domain.

As illustrated in FIG. 1, switches S2, S3, S4, and S5 all belong to switch S1's proximity group. Switches which are members of a proximity group share a common bond in that these switches have APs 12 connected thereto that are close to the APs connected to other switches in the proximity group. The switch 10 may join a proximity group based on information provided by the controller 14 or based on learning of client roams from switches not already in the proximity group. As described in detail below, the proximity group allows ultra fast roaming across the switch boundary by minimizing data outage time before a network route converges.

Figure 2:
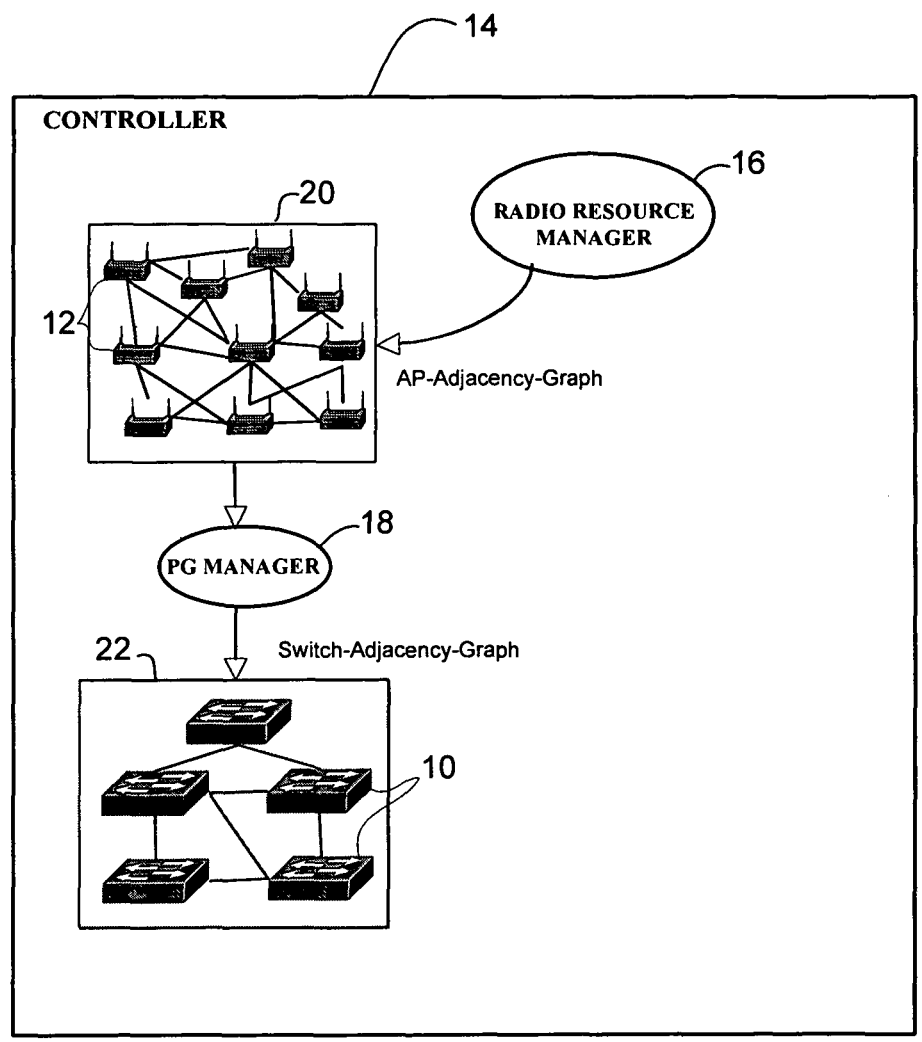
FIG. 2 illustrates one embodiment of a controller.

FIG. 2 illustrates details of the controller 14 in accordance with one embodiment. The controller 14 comprises a Radio Resource Manager (RRM) 16 and a proximity group (PG) manager 18. The RRM 16 keeps track of the geographical spread and strength of the RF signals of all the APs and uses this information to create an AP adjacency graph 20. The PG manager 18 knows the connectivity between the switches 10 and APs 12 and uses this information along with the AP adjacency graph 20 to create a switch adjacency graph 22.

Figure 3:
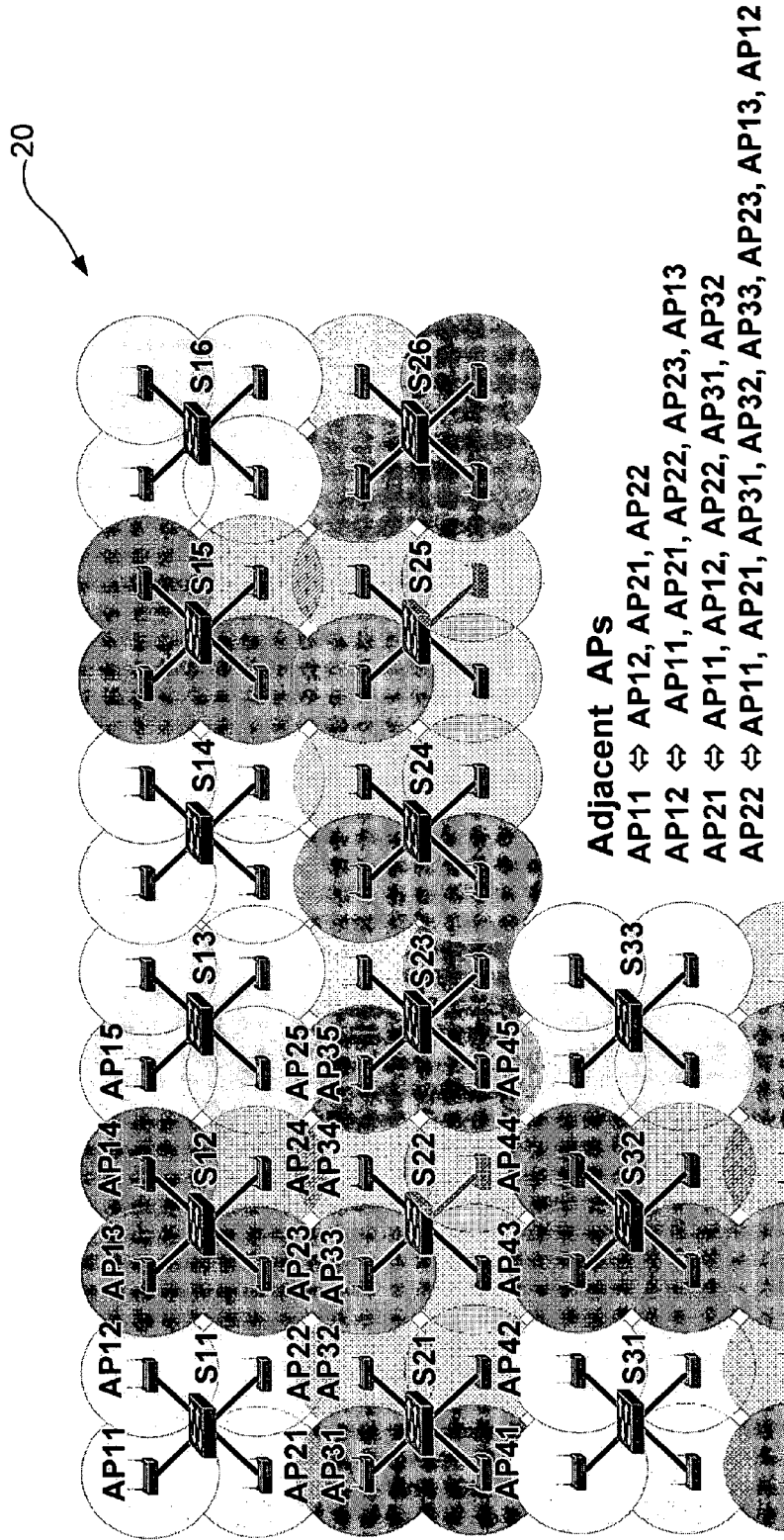
FIG. 3 illustrates an example of an adjacency graph.

An example of an AP adjacency graph 20 is illustrated in FIG. 3. The adjacency graph of FIG. 3 shows that AP11 has adjacent APs: AP12, AP21; and AP22. Adjacencies for AP12 comprise AP11, AP21, AP22, AP23, and AP13. Additional adjacencies are shown in FIG. 3.

In one embodiment, the adjacency graph 20 is constructed based on the APs ability to hear each other's beacon signal during an initial AP RF discovery phase. Each AP 12 may be capable of discovering, for example, thirty or more neighboring APs and reporting at least twenty of them based on the signal strength perceived by the reporting AP. The wireless controller 14 provides the PG manager 18 with a list of proximate APs. The proximity may be based on a configurable parameter such as the number of radio hops. The switch adjacency graph 22 may have a configurable hop-count-limit. Two switches 10 are considered adjacent to each other if at last one of their APs are adjacent each other within the given-hop-count-limit. The hop-count-limit may be set to one, for example, and only APs directly hearing each other will have their switches be adjacent to each other. In another example, the hop-count-limit is set to three, in which case a mobile client can roam from one AP to another that is two APs away, while ignoring all the stronger signals that the middle 2 APs provide.

The PG manager 18 uses the adjacency graph 20 to derive the switch adjacency graph 22. The PG manager 18 processes the proximate AP list and extrapolate this information into inclusive sets of proximate switches 10 based on a certain AP hop count. The PG manager 18 notifies the switches 10 in the wired domain that are proximate to a switch in the wireless domain.

Figure 4:
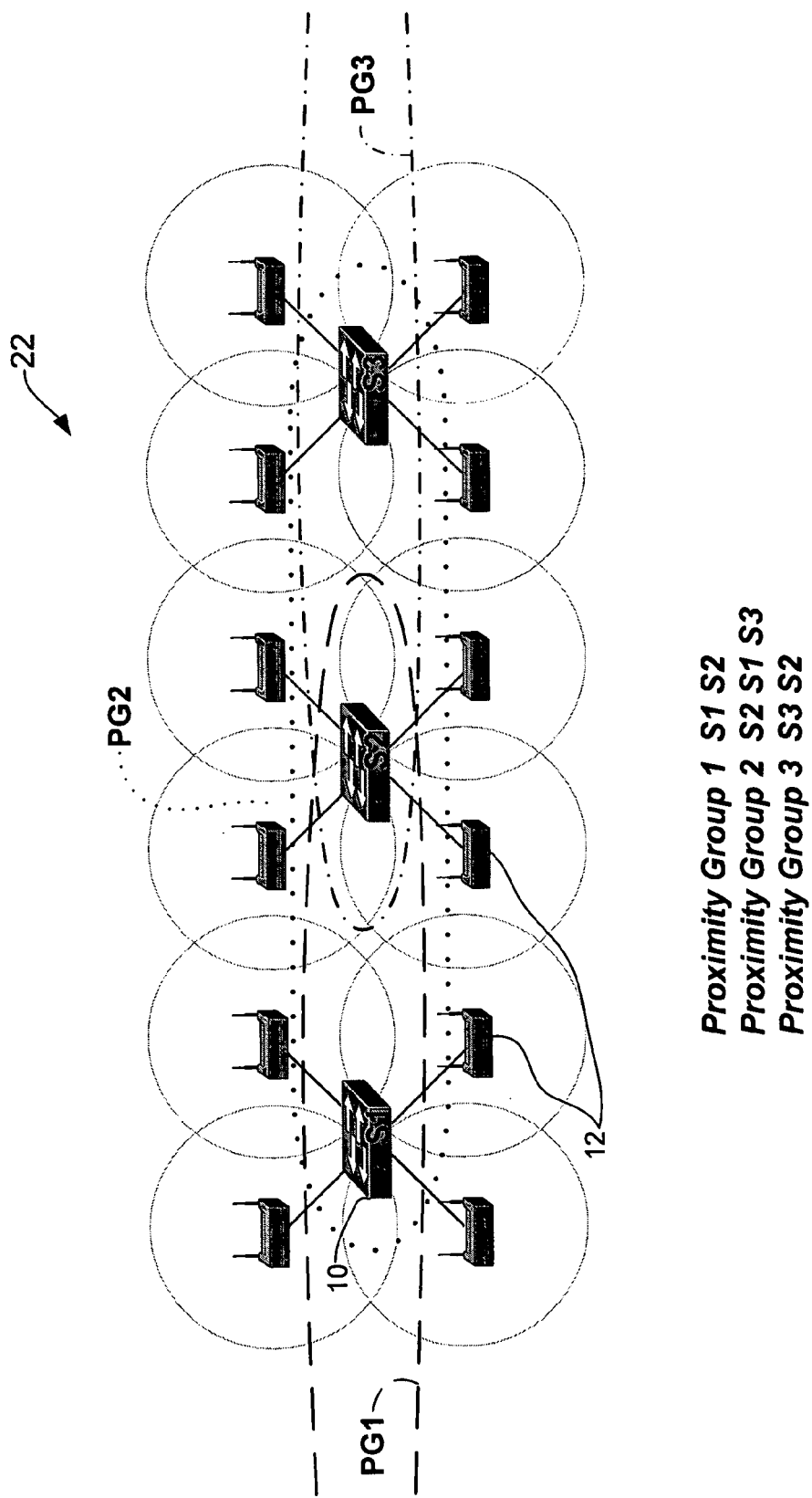
FIG. 4 illustrates an example of a switch proximity group.

The proximity group for a switch 10 includes its adjacent switches in the switch adjacency graph 22. FIG. 4 illustrates an example of three switch proximity groups PG1, PG2, PG3 for switches S1, S2, and S3, respectively. Proximity group 1 contains switch S1 and switch S2. Proximity group 2 contains switch S1, switch S2, and switch S3. Proximity group 3 contains switch S2 and switch S3.

The PG manager 18 instructs the switches 10 to join proximity groups based on different hop diameters. Each switch 10 has one proximity group and originates a multicast tree for the proximity group it owns. A switch 10 can be a member of multiple proximity groups. The switch joins the multicast tree for each proximity group that it is a member.

Membership of proximity groups can change during network operation based on changes in the radio layout. For example, if a new AP 12 is added or an existing AP is out of service, a proximity group change may be triggered. The controller 14 uses this information to update the AP adjacency graph 20 and switch adjacency graph 22, and sends new proximity group information to switches 10, as required. Heuristics can be built into the Proximity Group Manager to reduce the fluctuation of proximity group membership update due to the AP or radio going up and down or due to RF environment disruption.

Figure 5:
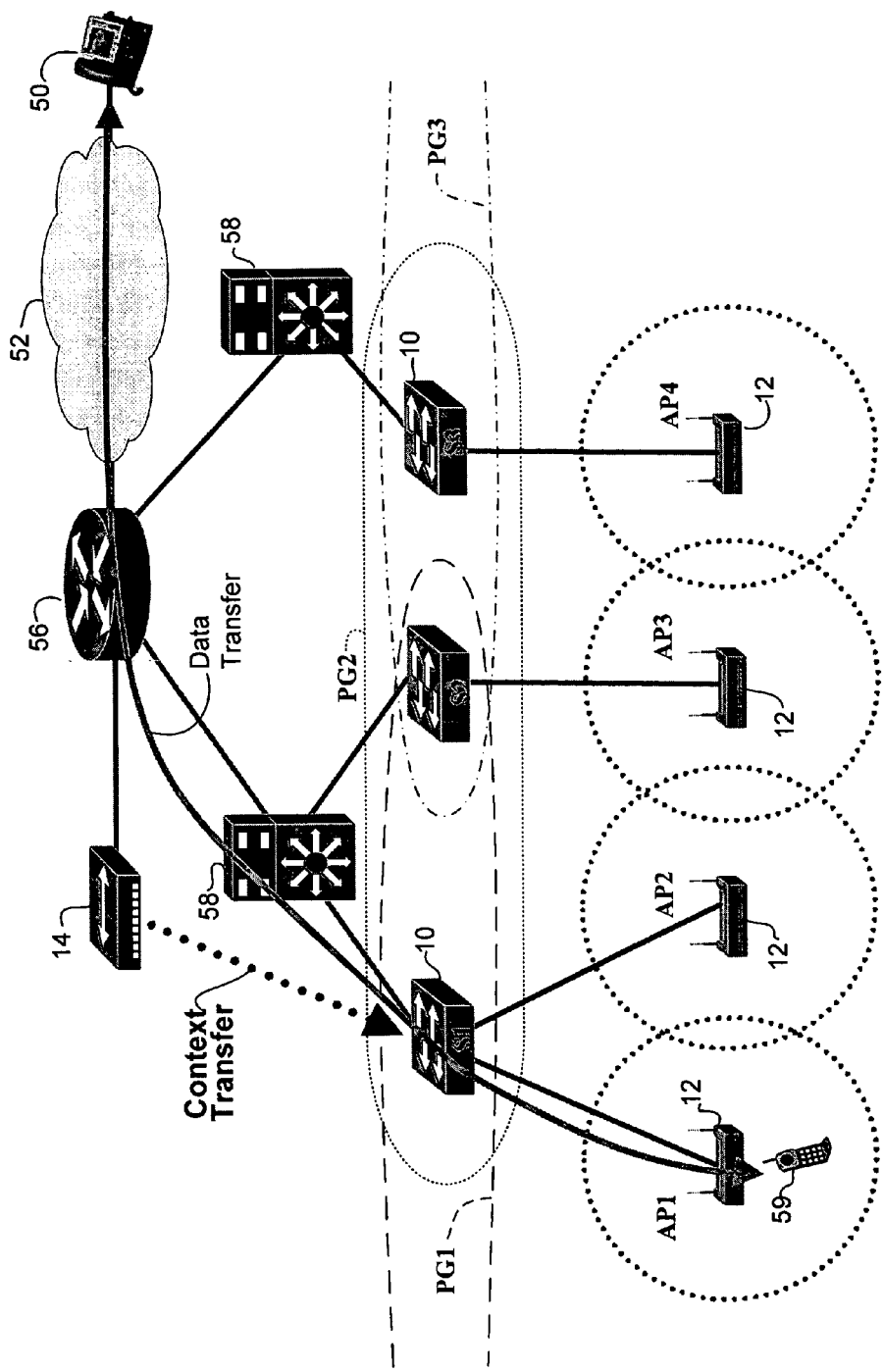
FIG. 5 illustrates initial context transfer for a new host association.
Figure 6:
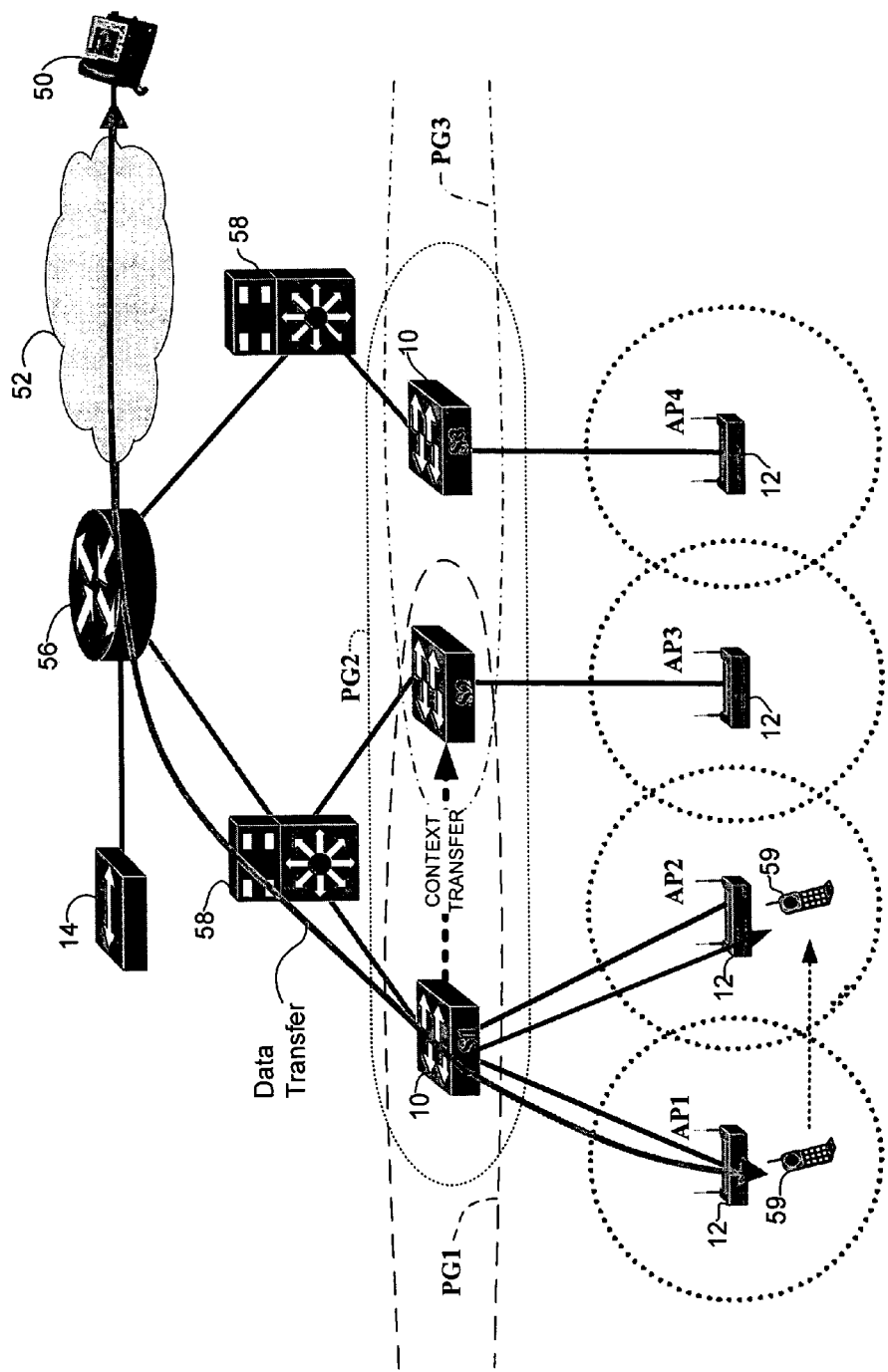
FIG. 6 illustrates context priming within a proximity group and intra-switch roaming.
Figure 7:
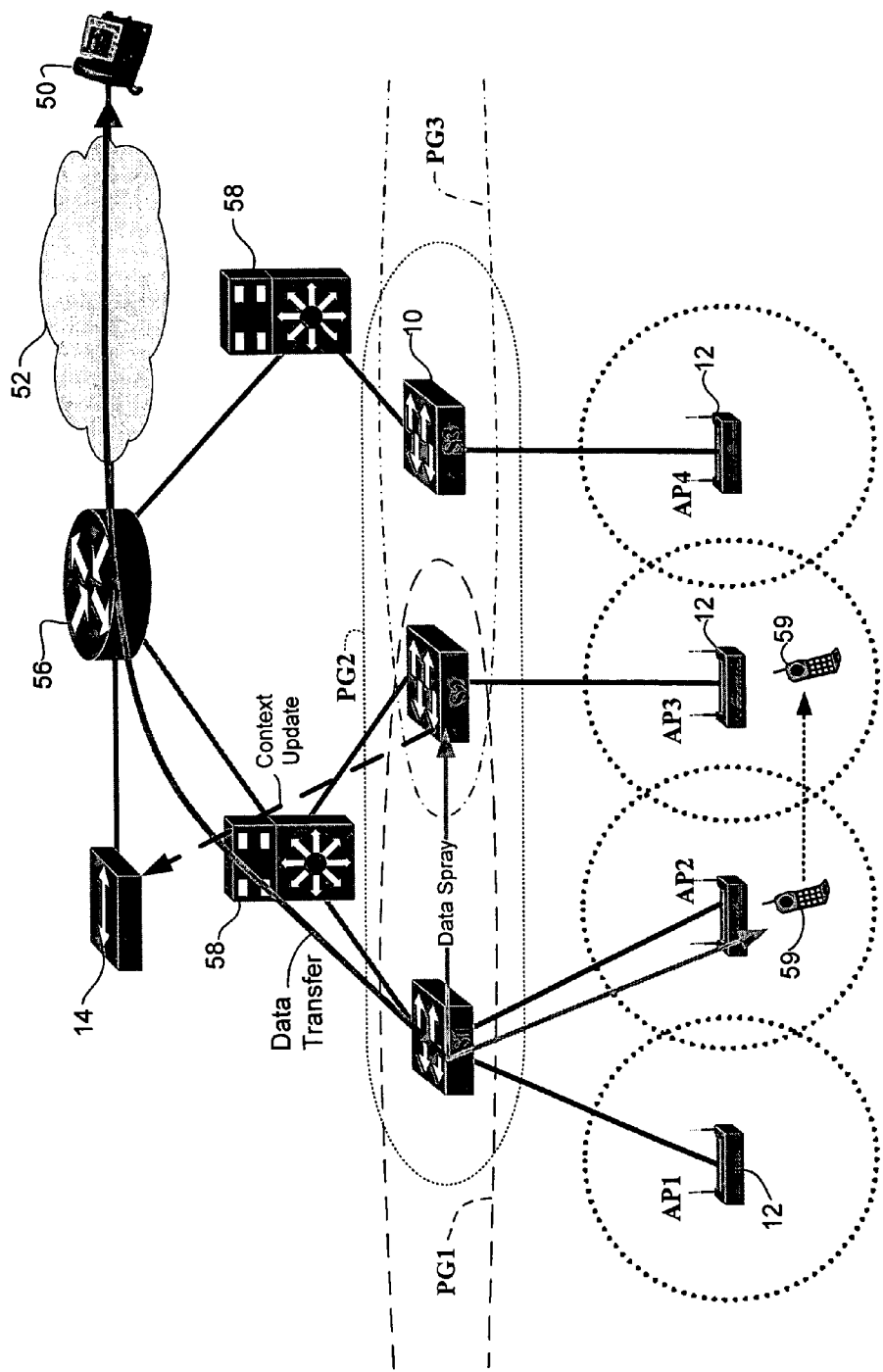
FIG. 7 illustrates data spray for an inter-switch roam.

FIGS. 5, 6, and 7 illustrate an example of switch operation for unicast traffic flow. A network device such as IP phone 50 is connected to network 52 and passes data traffic (Data Transfer) through router 56 to network device (e.g., gateway, router, switch) 58, which forwards traffic to switch 10. Traffic to and from wireless client 59 is forwarded or routed directly without having to pass through central controller 14. Three proximity groups are shown (PG1, PG2, PG3). PG1 is switch S1's proximity group and includes switch S2. PG2 is switch S2's proximity group and includes switches S1 and S3.

Switch S3's proximity group is PG3 and includes S2. For simplification only three switches are shown, however, it is to be understood that each proximity group may include additional switches. Furthermore, it is to be understood that the network shown in FIGS. 5, 6, and 7 is only one example and that other networks having different devices and configurations may be used without departing from the scope of the invention.

FIG. 5 illustrates initial context transfer for a new host association. Context information for client 59 is passed from controller 14 to switch S1. AP1 communicates with S1 and client 59 communicates with AP1. The client device 59 shown in FIG. 1 is a mobile phone, however, it is to be understood that the client may be any mobile device, such as a PDA (personal digital assistant), laptop computer, or any other wireless device.

FIG. 6 illustrates context priming within a proximity group and intra-switch roaming. In the example shown in FIG. 6, client 59 roams from AP1 to AP2. Since both AP1 and AP2 are in communication with the same switch S1, intra-switch roaming is performed. Roaming from one AP to another connected to the same switch is handled transparently within the switch. Switch S1 is already receiving data for client 59 and sends the data to AP2 after the client 59 has roamed to AP2.

Context of a client is proactively distributed across the switches which are members of the same proximity group, as illustrated by the Context Transfer from switch S1 to switch S2 (which both belong to proximity group PG1) in FIG. 6. This proactive distribution of context is done before the edge switch knows that the client is about to move to enable the other proximate edge switches to process the traffic to and from the mobile client when it roams over to them with minimal amount of handoff latency.

Transfer of context information enables the switches 10 to prime themselves with critical client information even before the client roams to an AP connected thereto. In order to protect the data from snoopers, link by link encryption may be used or the client context information may be encrypted using proximity group keys. The proximity group key's are pushed down during configuration and re-keying from the controller 14 to all switches in the proximity group. Alternatively the proximity group keys could be managed using any other group keying mechanism, such as described in RFC3547 (M. Baugher et al., "The Group Domain of Interpretation", July 2003), RFC3740 (T. Hardjono et al., "The Multicast Group Security Architecture", March 2004), RFC2627 (D. Waliner et al., "Key Management for Multicast: Issues and Architectures", June 1999), or RFC4046 (M Baugher et al., "Multicast Security (MSEC) Group Key Management Architecture", April 2005), for example.

The client context information may include, for example, client's identity, MAC address, IP addresses, encryption keys, token, location (physical switch identifier, port, AP, radio, and/or antenna), ACL policies, policy ID, client key material/state, client 802.1x state, client 802.11 state, 802.11 configuration, whitelist/blacklist information, client multicast information (e.g., multicast groups client has joined), current AP and neighboring AP list for the client, virtual port ID, user policies, 802.11 cookie, controller ID, client's WLAN (SSID), VLAN, access category, current posture, last posture, revalidation time, client ACLs/policy information, client's local mobility state, load balancing information, RSSI/SNR history for location associated with client, diagnostics, channel data, real-time logging, location subscription information for client, etc. It is to be understood that the client context information listed above is only provided as an example and that the client context information may contain any combination of these parameters or different parameters without departing from the scope of the invention.

The client context is leaked in the proximity group periodically. In one embodiment, one multicast distribution tree can be created and rooted per switch per proximity group and this multicast group is used to leak the client context. Also, another context distribution mechanism can be used.

Besides the periodic client context update to the proximity group, the context leak logic is triggered whenever there is an event that changes the state information of the client that should be synced in the proximity group. For example, if the client re-key timer expires, new keys are negotiated between the controller 14 and client 59 via the switch 10. A new token is passed to the client 59 and the client state information is marked as "to be updated" to indicate client context should be leaked. The updated client information is then pushed to other switches 10 within the switch's proximity group.

In one embodiment, switches 10 in the proximity group build a client context cache based on the context leak. The client context cache table can be built in hardware based on the leaked client context without CPU intervention, if the switch is capable of learning in hardware. If the switch does not have this capability, the cache in the DRAM or the CPU can install these cache entries in hardware based on the switch's hardware or software resource availability.

Each switch preferably performs its own local aging of client cache entries. For clients that have been inactive (non-local clients for whom a context prime is not received by the switch) the cache entries may be aged out. An aging algorithm may be run periodically or on demand (e.g., when a high level resource mark is reached). The aging algorithm is used to reclaim resources. The following is an example of an order in which client entries may be considered to be aged or reclaimed: a) entries belonging to clients that are no longer in the proximity group, b) entries belonging to clients that have not seen an update (activity) for the last configurable time period, c) entries belonging to clients that are not local to the switch and do not require a fast handoff, d) entries belonging to clients that are further away in RF AP hops, e) . . . etc.

In one embodiment, the client context cache entries are aged based on inactivity timers. The switches preferably use a timer to age out a cached client context and reset the timer every time the client context is received. For example, after timeout "T" seconds, the switch may age the client context from the cache table with the client context leaked every T/4 seconds. The client context is therefore only aged out when four or more client context messages are lost.

FIG. 7 illustrates an inter-switch roam by client 59 from AP2 to AP3. When wireless client 59 moves from AP2 to AP3, host routes for the client are pushed into the network domain. When client 59 first roams from AP2 to AP3, switch S1 continues to receive client traffic (Data Transfer in FIG. 7)). When switch S1 suspects or knows that the client 59 has roamed away from it (switch S1 got a disassociate message from the client), the switch encapsulates the traffic and forwards (sprays) any data traffic that it receives for the client to the members of the proximity group (Data Spray from switch S1 to switch S2 in FIG. 7). The spray starts when the client 59 explicitly disassociates with the switch S1 (e.g., disassociate message from client to switch) or after switch S2 informs switch S1 that the client 59 has shown up on their switch (e.g., Point-of-Attachment message from switch S2 to switch S1), as discussed below (whichever is earlier). Switch S2 already has all the necessary information to forward the client traffic sourced by the roamed client since it previously received client context information from switch S1 (FIG. 6). The spraying of downstream data traffic is performed for only a short duration (e.g., less than 1 second per roam). The spraying occurs while the routed/bridged wired network's infrastructure is processing the mobile client roam event (e.g., host-route or MAC address update). Once the network converges with respect to the client roam, the traffic is no longer sprayed. Sprayed data is preferably not re-sprayed to prevent spraying loops.

As discussed above, spraying begins when switch S1 learns that client 59 has roamed from AP2 to AP3, which is connected to switch S2 (FIG. 7). The switch may learn about the client roam from a disassociate message sent from the client. However, the client that roams away from an AP may not always disassociate with the old AP before it roams to the new AP. For example, the client may have sent the disassociation message, but due to a poor radio signal with the old AP because the client is out of RF range of the old AP (which is the reason client chose to move) the message does not make it to the old AP, or the AP may not disassociate with the old AP due to implementation of the client. In this case, the old switch would not realize that the client roamed until the old AP times out the client. This time out could be in the order of seconds. For this reason, once the client roams, the new switch preferably sends a Point-of-Attachment message to its proximity group so that the old switch is notified that the client has roamed. If the old switch already recognized that the client has roamed, it would just ignore the message and continue spraying the data traffic. The last step can also be optimized to unicast forwarding between the old and the new switches, when the Point-of-Attachment message is received.

Figure 8:
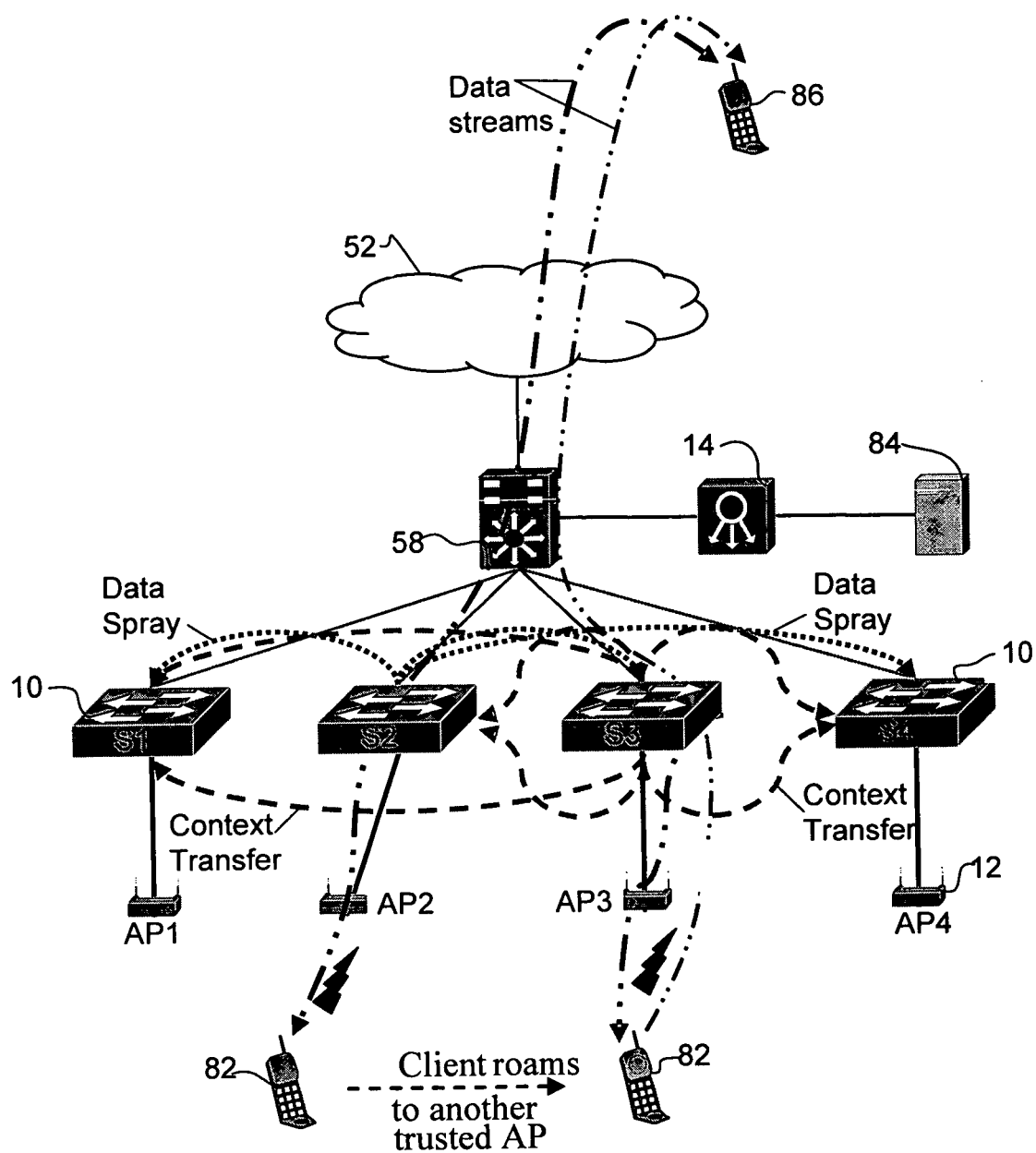
FIG. 8 illustrates an example of an inter-switch roam.
Figure 9:
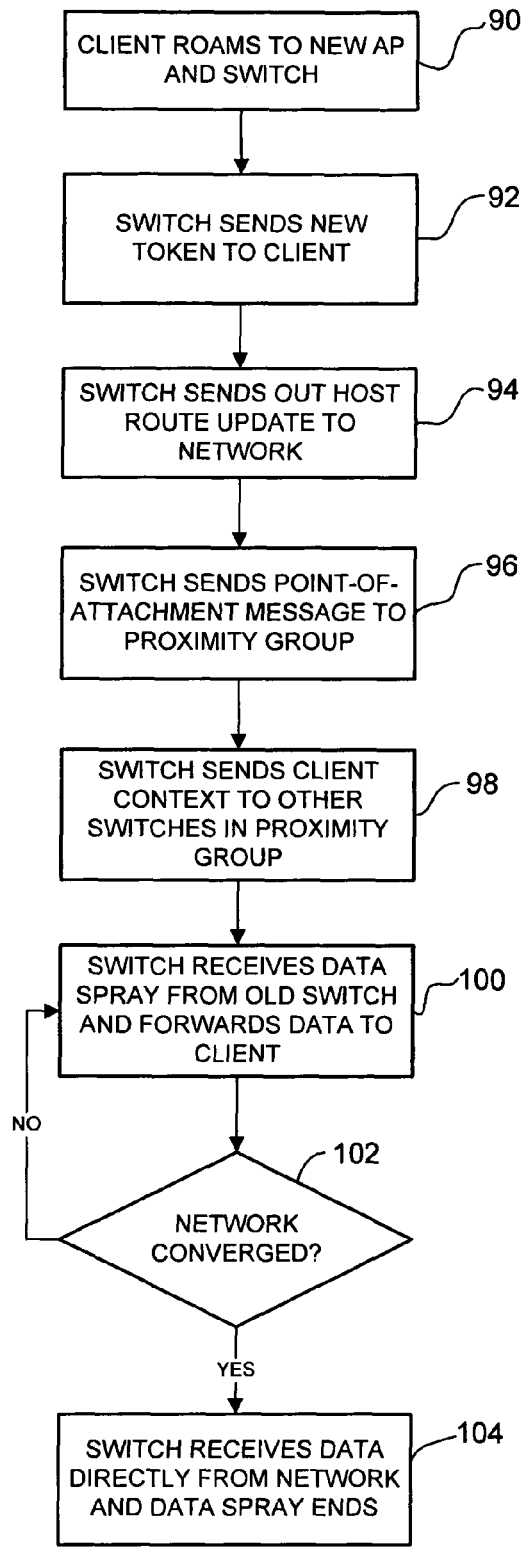
FIG. 9 is a flowchart illustrating a process for fast handoff mobility in accordance with one embodiment.

FIGS. 8 and 9 illustrate one example of a process for fast handoff of a wireless client 59 from a first network device S2 to a second network device S3 in a wired network. A simplified schematic of the network is shown with four switches S1, S2, S3, and S4 in FIG. 8. The proximity group for switch S2 is a 2-hop inclusive proximity group which contains S1, S3, and S4. The proximity group for S3 is also a 2-hop inclusive proximity group which contains S1, S2, and S4. A client 82 is initially in contact with AP2 and receives data from a mobile phone 86 through network 52, router 58, and switch S2. Router 58 is connected to controller 14 which is in communication with a server (e.g., AAA (authentication, authorization, and accounting) server) 84. The wireless controller 14 and the server 84 work together to authenticate new clients. The wireless controller 14 downloads the policies and keys for a new wireless client to the edge switch. The switch passes the trusted proximate AP list and token to the client.

Before the client roams, client state has already been leaked to other network devices in its proximity group. As previously discussed, the other network devices in its proximity group may comprise one or more devices. When the client 82 detects an RF signal quality degradation below a threshold or based on any other logic, it determines that it needs to find a new AP and examines the trusted AP list provided by the network.

Referring now to the flowchart of FIG. 9, client 82 roams to trusted AP3 and sends token information to AP3 at step 90. The new proximate switch S3 previously received client information from switch S2; therefore, switch S3 is ready to perform a fast authentication. Following a successful authorization and association message, switch S3 provides a new token to the client 82 (step 92). The client 82 also sends a disassociate message to AP2.

Switch S3 sends out a Host route update (control message) into the wired network to enable the network to converge using a control plane indicating the new point of attachment of the client 82 (step 94). It is to be understood that the term "route update" as used herein includes an address (e.g., MAC address) update. The Host route is used by the network to push the traffic destined for the mobile client 82 to the new access switch S3 once the network converges. The following takes place prior to network convergence (e.g., host route propagation through the network or MAC address update) to prevent loss of data during the transition.

Once the client is fully re-associated, switch S3 sends a Point-of-Attachment message to the other switches in its Proximity Group (step 96) so that the old switch S2 is notified that the client 82 has roamed, in case it did not receive the disassociation message from the client.

Client context is leaked in the new switch's proximity group (step 98) (Context Transfer in FIG. 8). The new switch S3 starts a timer for distribution of the information about the client that has roamed to the proximity group and leaks the client context in its proximity group.

In the time period in which the network has not yet converged, downstream traffic is sprayed in proximity group tress from switch S2 to other switches in its proximity group (steps 100 and 102) (Data Spray in FIG. 8). Upstream client traffic is sent native to its destination without any wait since wired network convergence is not required. The old switch S2 detects the condition that the network has not yet converged when its route for the client points to a local AP port, whereas the client cache entry says otherwise (either there is no cache entry or the cache entry has been updated by the context prime from another switch in the proximity group, or the cache entry has marked the clients location as unknown (disassociate message is seen and the switch has not seen a context prime to update the client's state)). The old switch S2 then sprays all the traffic it receives for the client 82 in the proximity group, and adds the client information tag along with the packet. The switch marks a flag in the client information to indicate that it was an anchor point for the client in the past, but not currently. The new switch S3 forwards downstream traffic to the client.

Once the network converges, the traffic is sent directly to the new switch S3 (step 104). When the routes in the network and the old switch S2 converge, the traffic to the client 82 is automatically sent to the new switch S3, and the old switch S2 no longer gets any traffic it needs to tag. If the old switch does see any traffic for the client because it happens to be in the route path, it simply forwards the traffic natively in the direction of the new switch. The new switch detects this condition by examining whether it is in the converged state with respect to the client or not as previously discussed.

It is to be understood that the process shown in the schematic of FIG. 8 and the flowchart of FIG. 9 is only one example and that steps may be removed or added, and the order of the steps may be changed, without departing from the scope of the invention.

The following describes how multicast traffic is handled using proximity groups.

Typically, with conventional IP multicast deployment, for each source and group a multicast tree is formed from the source towards the clients, which are the leaves of the tree. There exists only one path from the source towards the leaf. In the majority of cases wireless clients are multicast receivers rather than sources. With conventional implementations, if the client roams towards a new AP attached to a new switch, the new switch or AP has to send an IGMP (Internet Group Management Protocol) or MLD (Multicast Listener Discovery) query to determine if the roamed client has joined any group. This happens after the authentication phase. The client sends the IGMP join for the groups it is interested in and the traffic is pulled towards the client after the roam. However, there is a significant delay with this behavior even after the client response, because the multicast tree may need to be formed from source towards the new switch.

Use of proximity groups allows the client to get the IP multicast traffic quickly after the roam. When the client joins a multicast group, it sends an IGMP report. When the switch learns about the group, it advertises the group towards all the switches in its proximity group, along with the client information for the client that has joined the group. Thus, all switches in the proximity group are aware of all clients that have joined a particular group. The switch that has anchored the client pulls the traffic and sends it downstream towards the AP and client. The other switches in the proximity group continue to pull the traffic from upstream but do not forward the traffic downstream towards an AP and client. Once the client roams to another switch in the proximity group and the authentication phase is complete, the new switch right away starts forwarding any downstream multicast traffic the client is interested in. At the same time, since the client has moved to a different switch, the client group information is sent towards other switches in the new switch's proximity group.

The states of the group and client are preferably periodically refreshed after periodic IGMP query messages. If the client leaves a group silently or explicitly sending an IGMP leave, the switch pulls out the downstream port and prunes the traffic downstream, if this were the only client interested in the group on that port to the AP. This deletion of information is sent towards all the clients in the proximity group so they can update the group and client database.

Figure 10:
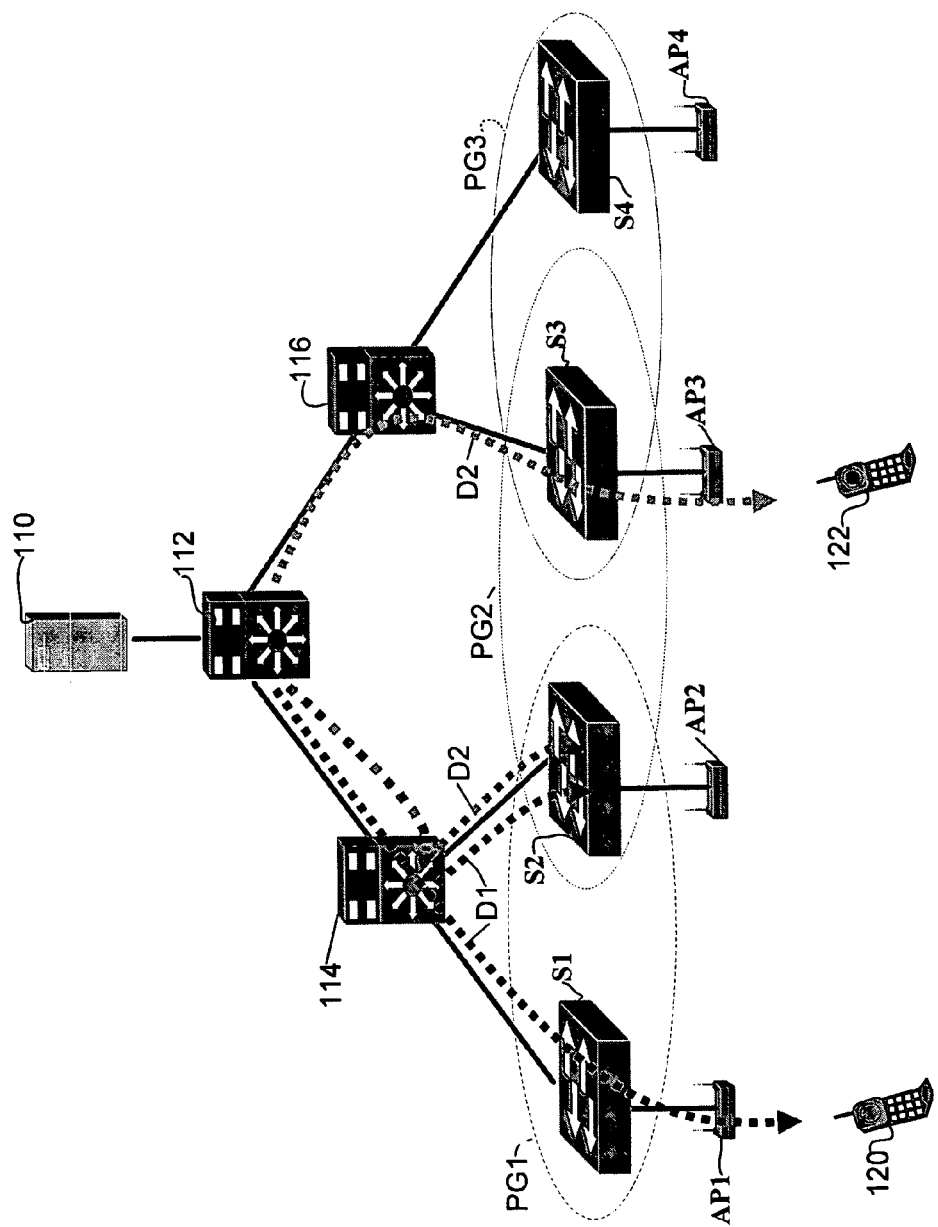
FIG. 10 illustrates downstream multicast traffic with a proximity group.

FIG. 10 illustrates distribution of downstream multicast traffic using proximity groups. A network includes server 110, routers 112, 114, 116, switches S1, S2, S3, and S4, Access Points AP1, AP2, AP3, and AP4, and clients 120 and 122. Proximity group PG1 includes switches S1 and S2. Proximity group PG2 includes switches S2 and S3. Proximity group PG3 includes switches S3 and S4. Client 120 is anchored to AP1 and switch S1, therefore, multicast traffic D1 for client 120 is pulled towards S1 and S2, which are in the same proximity group PG1. Since client 120 is in communication with AP1, only S1 forwards the traffic downstream. Client 122 is anchored to AP3 and switch S3. Multicast traffic D2 for client 122 is pulled towards switches S2 and S3, but only S3 forwards the traffic to AP3.

Figure 11:
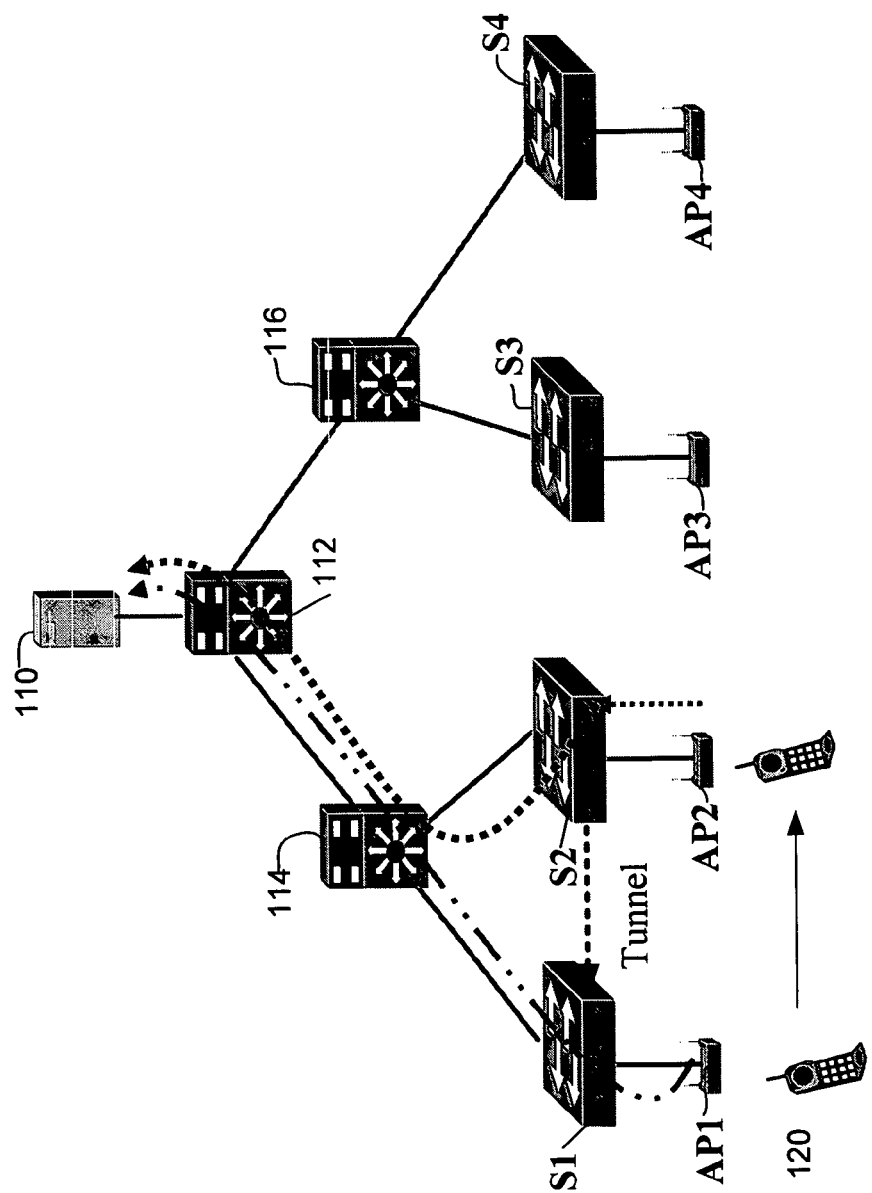
FIG. 11 illustrates upstream multicast traffic with a proximity group.

FIG. 11 illustrates upstream multicast traffic using proximity groups. When the client roams from AP1 and switch S1 to AP2 and switch S2, the multicast packets are sent towards switch S1 and sent as native upstream traffic (see Tunnel on FIG. 11). Once the route converges, the traffic is pulled upstream automatically and traffic that is sent with an encapsulation towards switch S1 will be dropped when sent upstream due to a multicast RPF (Reverse Path Forwarding) check failure. It is important that the upstream IP multicast traffic is properly forwarded after a roam, because if the upstream IP multicast traffic is sent towards the wrong upstream neighbor before route convergence, it can get dropped due to a multicast RPF check at the upstream neighbors. To minimize disruption of upstream traffic, the packets are sent towards the old switch S1 after which they may be sent as native upstream. Preferably, all switches in the proximity group are notified as to where the client is connected to, so that the packets can be sent back towards the old switch with an encapsulation. After route convergence, the traffic is automatically pulled by the upstream neighbor. Once the old switch determines that RPF is on an interface where the encapsulated packets are arriving, it sends a prune towards the source of the originator of the encapsulated traffic.

Figure 12:
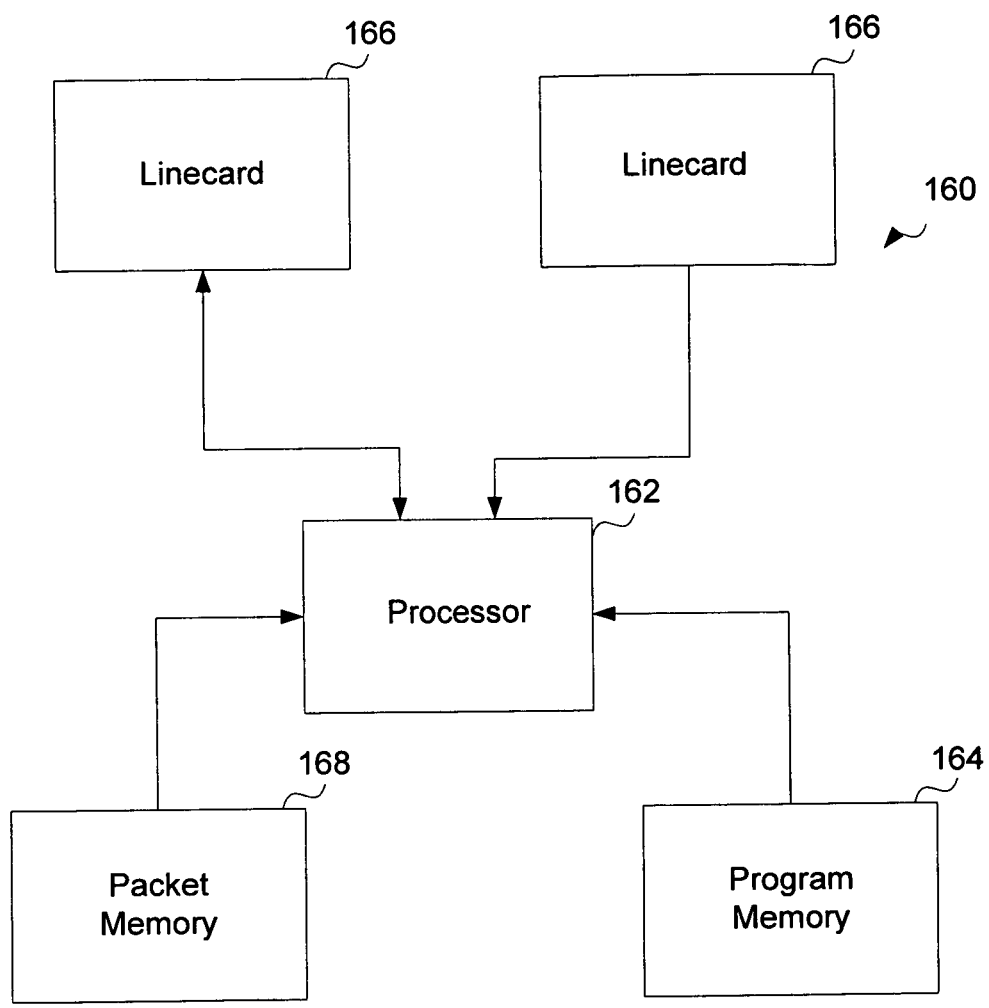
FIG. 12 depicts an example of a network device useful in implementing embodiments described herein.

FIG. 12 depicts a network device 160 that may be used to implement embodiments described herein. In one embodiment, network device 160 is a programmable machine that may be implemented in hardware, software, or any combination thereof. A processor 162 executes codes stored in a program memory 164. Program memory 164 is one example of a computer-readable medium. Program memory 164 can be a volatile memory. Another form of computer-readable medium storing the same codes would be some type of non-volatile storage such as floppy disks, CD-ROMs, DVD-ROMs, hard disks, flash memory, etc. A carrier wave that carries the code across the network is an example of a transmission medium.

Network device 160 interfaces with physical media via a plurality of linecards 166. Linecards 166 may incorporate Ethernet interfaces, DSL interfaces, Gigabit Ethernet interfaces, 10-Gigabit Ethernet interfaces, SONET interfaces, etc. As packets are received, processed, and forwarded by network device 160, they may be stored in a packet memory 168. To implement functionality according to the system, linecards 166 may incorporate processing and memory resources similar to those discussed above in connection with the network device as a whole.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for handoff of a wireless client from a first switch to a second switch in a wired network, the first and second switches in communication with a plurality of access points, the method comprising:
  receiving data from the wireless client at the second switch via one of the access points following an inter-switch roam;
  transmitting from the second switch, a request for a route update for the wireless client to the wired network, in response to said received data;
  prior to network convergence for said route update, receiving at the second switch, data traffic destined for the wireless client from the first switch and forwarding said data traffic to the wireless client;
  receiving information identifying other switches in a proximity group; and
  transmitting context information for the wireless client from the second switch to said other switches in said proximity group, wherein said other switches in said proximity group are in communication with access points located within a specified radio frequency range of at least one of the access points in communication with the second switch.

2. The method of claim 1 further comprising generating a multicast tree for said proximity group.

3. The method of claim 1 wherein the second switch is in a proximity group of the first switch.

4. The method of claim 1 wherein said proximity group is defined based on the access points connected to the first switch.

5. The method of claim 1 further comprising transmitting a point-of-attachment message to said other switches in said proximity group upon receiving data from the wireless client.

6. The method of claim 1 further comprising receiving said context information for the wireless client prior to receiving data from the wireless client.

7. The method of claim 1 further comprising receiving a disassociation message from the wireless client and forwarding data traffic received for the wireless client to said other switches in said proximity group.

8. The method of claim 1 further comprising, after network convergence for said route update, receiving said data traffic from a router within the wired network and forwarding said data traffic to the wireless client.

9. The method of claim 1 further comprising transmitting a token and authentication message to the wireless client prior to network convergence for said route update.

10. The method of claim 1 further comprising advertising a multicast group joined by the wireless client to said other switches in said proximity group.

11. The method of claim 1 further comprising transmitting upstream multicast traffic from the wireless client to the first switch prior to route convergence.

12. An apparatus for handoff of a wireless client from a switch in a wired network, the apparatus comprising:
- a processor configured for transmitting a request for a route update to the wired network upon receiving data from the wireless client via an access point following an inter-switch roam, receiving data traffic destined for the wireless client from the switch prior to network convergence for said route update and forwarding said data traffic to the wireless client, receiving information identifying other switches in a proximity group; and transmitting context information for the wireless client to said other switches in said proximity group; and
- memory for storing information identifying said other switches in said proximity group and said context information for the wireless client received from the switch prior to receiving said data from the wireless client;
- wherein said other switches in said proximity group are in communication with access points located within a specified radio frequency range of at least one of the access points in communication with the second switch.

13. The apparatus of claim 12 wherein said context information is stored in a context cache table, the processor configured to age entries in said context cache table after a specified period of time.

14. The apparatus of claim 12 wherein the processor is operable to generate a multicast tree comprising said other switches in said proximity group.

15. The apparatus of claim 12 wherein said proximity group is defined based on the access points in communication with the apparatus.

16. The apparatus of claim 12 wherein the processor is configured for advertising a multicast group joined by the wireless client to said other switches in said proximity group.

17. An apparatus for handoff of a wireless client from a first switch to a second switch in a wired network, the first and second switches in communication with a plurality of access points, the apparatus comprising:
- means for transmitting a request for a route update for a wireless client to the wired network, in response to receiving data from a wireless client at the second switch via one of the access points following an inter-switch roam;
- means for forwarding to the wireless client, data traffic received for the wireless client from the first switch prior to network convergence for said route update; and
- means for transmitting context information for the wireless client from the second switch to other switches in a proximity group of the second switch;
- wherein said other switches in said proximity group are in communication with access points located within a specified radio frequency range of at least one of the access points in communication with the second switch.

18. The system of claim 17 further comprising means for receiving said context information for the wireless client prior to receiving data from the wireless client.

* * * * *